(12) United States Patent
Kito et al.

(10) Patent No.: US 10,006,565 B2
(45) Date of Patent: Jun. 26, 2018

(54) FUEL SUPPLY APPARATUS

(71) Applicant: TOYODA GOSEI CO., LTD., Kiyosu-shi, Aichi-ken (JP)

(72) Inventors: Hiroaki Kito, Kiyosu (JP); Yoshinari Hiramatsu, Kiyosu (JP); Yukiharu Takeuchi, Kiyosu (JP); Sanae Noro, Gifu (JP); Takeshi Aimiya, Nagoya (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 18 days.

(21) Appl. No.: 15/262,044

(22) Filed: Sep. 12, 2016

(65) Prior Publication Data

US 2017/0089491 A1 Mar. 30, 2017

(30) Foreign Application Priority Data

Sep. 25, 2015 (JP) ................. 2015-188210

(51) Int. Cl.
| | |
|---|---|
| *F16L 3/00* | (2006.01) |
| *F16L 3/10* | (2006.01) |
| *F16L 3/14* | (2006.01) |
| *F16L 55/02* | (2006.01) |
| *B60K 15/04* | (2006.01) |
| *F16L 55/035* | (2006.01) |

(52) U.S. Cl.
CPC ............ *F16L 3/1016* (2013.01); *B60K 15/04* (2013.01); *F16L 3/14* (2013.01); *F16L 55/02* (2013.01); *F16L 55/035* (2013.01)

(58) Field of Classification Search
CPC .......... B60K 15/04; F02N 37/001; F16L 3/12
USPC ....... 138/106, 107; 248/74.1, 74.2, 73, 68.1, 248/55, 71
See application file for complete search history.

(56) References Cited

U.S. PATENT DOCUMENTS

| | | | | |
|---|---|---|---|---|
| 4,614,321 A | * | 9/1986 | Andre ................... | F16B 5/0685 24/555 |
| 5,704,573 A | * | 1/1998 | de Beers .................. | F16L 3/13 248/73 |
| 7,559,511 B2 | * | 7/2009 | Yon ....................... | F16L 3/2235 174/135 |
| 9,718,349 B2 | * | 8/2017 | Kito ..................... | B60K 15/04 |
| 2004/0007648 A1 | * | 1/2004 | Miura ..................... | F16L 3/13 248/71 |
| 2015/0274008 A1 | | 10/2015 | Kito et al. | |
| 2015/0377387 A1 | * | 12/2015 | Meyers .............. | B29C 45/0017 248/74.2 |

FOREIGN PATENT DOCUMENTS

JP 2011-133003 A 7/2011

* cited by examiner

*Primary Examiner* — Patrick F Brinson
(74) *Attorney, Agent, or Firm* — Posz Law Group, PLC

(57) ABSTRACT

A fixation member configured to fix a filler pipe to the vehicle body includes a flexural deformation portion. In a non-surrounded state, this flexural deformation portion is not flexurally deformed but is located on the inner side of the outer circumference of a filler neck body. In a surrounded state, the flexural deformation portion is flexurally deformed to induce a pressing force and provides the pressing force to the filler pipe. This configuration suppresses rattling of the filler pipe over a long time period.

3 Claims, 17 Drawing Sheets

M-M SECTION

FUEL SUPPLY APPARATUS

CROSS REFERENCE TO RELATED APPLICATION

The present application claims priority based on Japanese patent application No. 2015-188210 filed on Sep. 25, 2015, the disclosure of which is hereby incorporated by reference into this application.

BACKGROUND

Field

The disclosure relates to a fuel supply apparatus.

Related Art

In a fuel supply apparatus, a filler pipe provided to introduce a fuel to a fuel tank is generally formed from a resin for the purpose of weight reduction and is held on the vehicle body by a fixation member. A known configuration of the fixation member includes a resin pipe clamping portion provided to clamp the filler pipe and a metal fixture provided to mount the pipe clamping portion to the vehicle body (JP 2011-133003A).

This technique of holding the filler pipe causes the resin pipe clamping portion to be elastically deformed and press the filler pipe and is thus advantageous in terms of enhancing the force of holding the filler pipe. In the state that the pipe clamping portion presses the filler pipe, the pipe holding portion continuously receives a reactive force against pressing. The resin pipe clamping portion used for a long time period is likely to have creep deformation and to be significantly deformed by the reactive force caused by the creep deformation. This may result in rattling the filler pipe.

SUMMARY

According to one aspect of the present disclosure, there is provided a fuel supply apparatus. The fuel supply apparatus may comprise a resin filler pipe configured to form a fuel passage from a filler port to a fuel tank; and a metal fixation member configured to fix the filler pipe to a vehicle body. The fixation member may include a surrounding portion configured to surround outside of at least part of the filler pipe, and a fixation portion configured to fix the surrounding portion to the vehicle body. At least part of the surrounding portion may be formed as an elastically deformable flexural deformation portion. At least part of the flexural deformation portion in a non-surrounded state that the surrounding portion does not surround outside of at least part of the filler pipe may be located on an inner side of outer circumference of the filler pipe in a surrounded state that the surrounding portion is arranged to surround outside of at least part of the filler pipe.

DESCRIPTION OF EMBODIMENTS

A. First Embodiment

Figure 1:
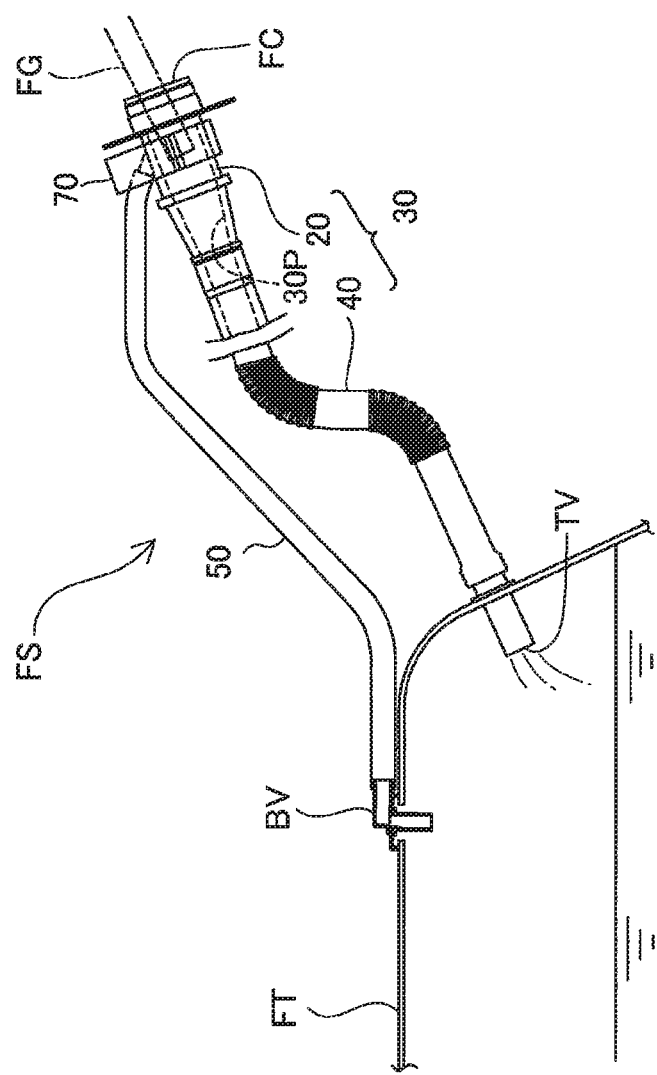
FIG. 1 is a diagram illustrating the schematic configuration of a fuel supply apparatus according to an embodiment to supply a fuel to a fuel tank of a motor vehicle.

FIG. 1 is a diagram illustrating the schematic configuration of a fuel supply apparatus FS according to an embodiment to supply a fuel to a fuel tank FT of a motor vehicle. The fuel supply apparatus FS includes a filler pipe 30, a fuel vapor pipe 50, a fixation member 70, a check valve TV and a gas release structure BV. The filler pipe 30 is configured by connecting a resin filler tube 40 with a resin filler neck 20. The filler pipe 30 forms a fuel passage 30P from a filler port FC to the filler tank FT. The filler neck 20 is fixed to a fuel supply part (not shown) of the vehicle by the fixation member 70. The filler neck 20 serves to receive a fuel gun FG that is inserted into the filler port FC. The filler tube 40 is configured to be extensible and bendable to some extent. The filler tube 40 is configured by, for example, a resin tube having accordion structures at two different locations. This filler tube 40 is connected with the filler tank FT via the check valve TV. The fuel discharged from the fuel gun FG inserted in the filler port FC flows through the fuel passage 30P formed by the filler pipe 30 and the check valve TV and is supplied to the fuel tank FT. The check valve TV serves to prevent the backflow of the fuel from the fuel tank FT to the filler tube 40.

Figure 2:
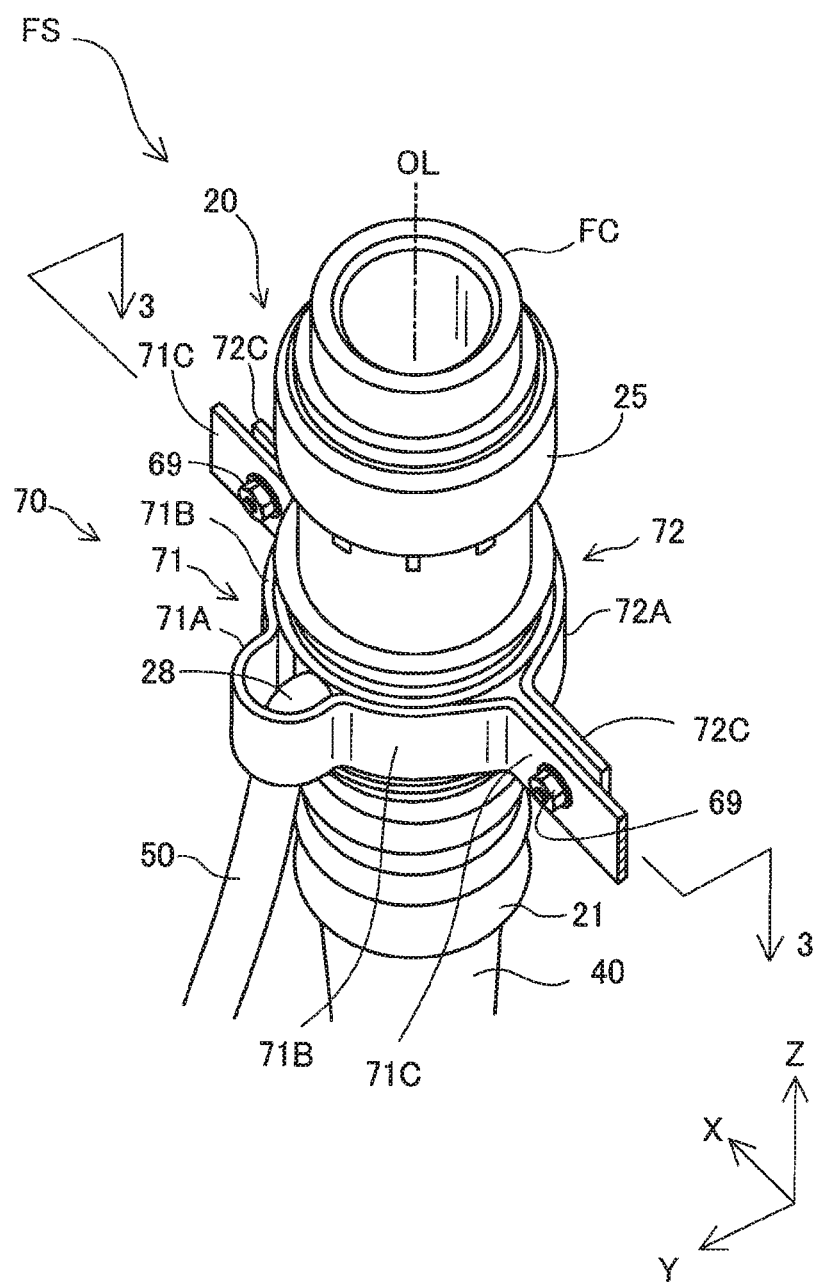
FIG. 2 is a perspective view illustrating the configuration in the vicinity of a filler neck.

The fuel vapor pipe 50 has one end connected with the fuel tank FT via the gas release structure BV and the other end connected with a fuel vapor port 28 protruded from the filler neck 20 (as shown in FIG. 2). The gas release structure BV serves as a coupler to connect the fuel vapor pipe 50 with the fuel tank FT and sends the tank inner air including the fuel vapor to the fuel vapor pipe 50. The fuel vapor is introduced with the supplied fuel through the fuel vapor pipe 50 to the fuel tank FT during fueling from the fuel gun FG.

Figure 3:
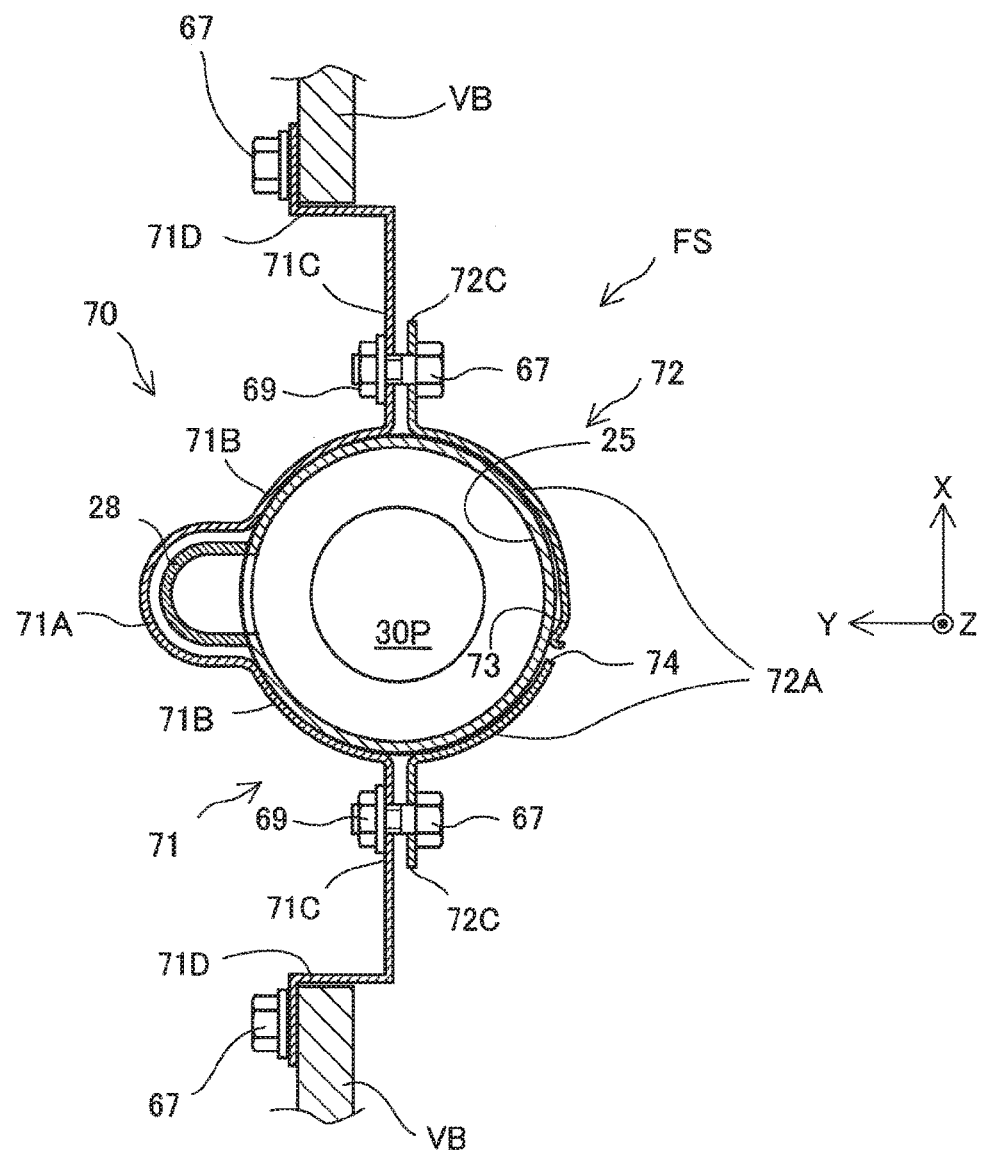
FIG. 3 is a diagram illustrating a sectional view of the vicinity of a fixation member of a first embodiment, taken on a line 3-3 in FIG. 2.

FIG. 2 is a perspective view illustrating the configuration in the vicinity of the filler neck 20. FIG. 3 is a diagram illustrating a sectional view of the vicinity of the fixation member 70 of a first embodiment, taken on a line 3-3 in FIG. 2. A coordinate system of three axes, i.e., X axis, Y axis and Z axis is shown in FIG. 2 and subsequent drawings. The Z axis is parallel to the direction of extension of the filler neck 20. The +Y direction is parallel to the direction of formation of the fuel vapor port 28 described later. Hereinafter the positional relationship of the respective members may be described with reference to the X axis, the Y axis and the Z axis as appropriate.

The filler neck 20 includes a filler neck body 25 and the fuel vapor port 28. The filler neck body 25 is extended along a direction parallel to the Z axis. The filler neck body 25 is formed from a conductive resin. The filler neck body 25 is formed in a hollow cylindrical shape. The filler neck body 25 has the filler port FC on its one end. The diameter of part of the filler neck body 25 near to the filler port FC is larger than the diameter of the remaining part. The filler neck body 25 has a tube connecting structure 21 on the other end. This tube connecting structure 21 is inserted into the filler tube 40, so that the filler neck body 25 is connected with the filler tube 40. Corrugated steps are formed around the outer circumference of the tube connecting structure 21, in order to enhance the sealing performance between the tube connecting structure 21 and the filler tube 40 inserted thereon. As shown in FIG. 1, the filler pipe 30 forms the fuel passage 30P between the filler neck body 25 and the fuel tank FT.

The fuel vapor port 28 has a hollow cylindrical outer shape having the smaller diameter than that of the filler neck body 25 and is provided to be branched off in the +Y direction from the filler neck body 25. The fuel vapor port 28 has a base end that is integrally formed and joined with the filler neck body 25. The fuel vapor port 28 has a leading end that is inserted in and fixed to the fuel vapor pipe 50. Corrugated steps are formed around the outer circumference at the leading end of the fuel vapor port 28, in order to enhance the sealing performance between the fuel vapor port 28 and the fuel vapor pipe 50 inserted thereon.

The fixation member 70 is configured by metal fittings. The fixation member 70 is fixed to the region of the filler neck body 25 with which the fuel vapor port 28 is joined. The fixation member 70 is located around the filler neck outer circumference about a center axis OL of the filler neck body 25 to surround part of the filler neck body 25 and the joint of the fuel vapor port 28 with the filler neck body 25. More specifically the fixation member 70 includes a first fixture 71 and a second fixture 72. The first fixture 71 and the second fixture 72 are arranged to face each other across the filler neck body 25 and are clamped and fixed to each other by means of bolts 67 and nuts 69.

The first fixture 71 is formed by pressing a metal plate member such as conductive stainless steel plate. The first fixture 71 is formed in a band-like outer shape. The first fixture 71 includes a curved portion 71A, a pair of large diameter portions 71B, a pair of flat plate portions 71C and a pair of fixation element portions 71D. The curved portion 71A is provided to cover the fuel vapor port 28 with a clearance. The pair of large diameter portions 71B are arranged with the curved portion 71A placed therebetween to be continuous with the respective ends of the curved portion 71A. The pair of flat plate portions 71C are arranged with the curved portion 71A and the pair of large diameter portions 71B placed therebetween to be continuous with the respective other ends of the large diameter portions 71B that are opposite to their respective one ends continuous with the curved portion 71A. The pair of fixation element portions 71D are arranged with the curved portion 71A, the pair of large diameter portions 71B and the pair of flat plate portions 71C placed therebetween to be continuous with the respective other ends of the flat plate portions 71C that are opposite to their respective one ends continuous with the large diameter portions 71B. The pair of large diameter portions 71B are curved along the curvature of the filler neck body 25 and are arranged to cover an approximately semicircular arc region of the filler neck body 25. The pair of large diameter portions 71B cooperate with a large diameter portion 72A of the second fixture 72 described later to surround the outside of the filler neck body 25 in the state that the fixation member 70 is mounted to the filler neck body 25.

The pair of flat plate portions 71C serve as fixation regions to be fixed with flat plate portions 72C of the second fixture 72 described later by means of the bolts 67 and the nut 69 for mounting the fixation member 70 to the filler neck body 25. Each flat plate portion 71C has a through hole for insertion of the bolt 67.

The pair of fixation element portions 71D are provided continuously with the ends of the corresponding flat plate portions 71C to be bent relative to the flat plate portions 71C. Each fixation element portion 71D is fixed at a fixation position VB of the vehicle body (not shown) by means of the bolt 67. The pair of fixation element portions 71D of the embodiment correspond to the subordinate concept of the fixation portion in the claims. The filler pipe 30 is fixed to the vehicle body by fixation of the fixation element portions 71D at the fixation positions VB. The filler neck body 25 of the filler pipe 30 is accordingly surrounded by the first fixture 71 and the second fixture 72.

Like the first fixture 71, the second fixture 72 is formed by pressing a meta plate member such as conductive stainless steel plate. The second fixture 72 is also formed in a band-like outer shape. The second fixture 72 includes a large diameter portion 72A, a pair of flat plate portions 72C and a flexural deformation portion 73. The large diameter portion 72A is curved along the curvature of the filler neck body 25 and is formed to cover an approximately semicircular arc region of the filler neck body 25. The pair of flat plate portions 72C are arranged with the large diameter portion 72A placed therebetween to be continuous with the respective ends of the large diameter portion 72A. The large diameter portion 72A is arranged to face the pair of large diameter portions 71B of the first fixture 71 across the filler neck body 25. In the state that the fixation member 70 is mounted to the filler neck body 25, the large diameter portion 72A cooperates with the pair of large diameter portions 71B of the first fixture 71 to surround the outside of the filler neck body 25. According to this embodiment, the pair of large diameter portions 71B of the first fixture 71 and the large diameter portion 72A of the second fixture 72 embody the surrounding portion in the claims.

The pair of flat plate portions 72C of the second fixture 72 are arranged to respectively face the pair of flat plate portions 71C of the first fixture 71. The pair of flat plate portions 72C and the pair of flat plate portions 71C are clamped and fixed to each other by means of the bolts 67 and the nuts 69 when the filler neck 20 is fixed at the fixation positions VB of the vehicle by the fixation member 70. Each flat plate portion 72C has a through hole for insertion of the bolt 67, like the flat plate portion 71C.

The flexural deformation portion 73 of the second fixture 72 is formed in a partial region of the large diameter portion 72A of the second fixture 72 to be elastically deformable by punching and bending in press working. The flexural deformation portion 73 is flexurally deformed by a force of pressing the filler neck body 25 (hereinafter this force is called pressing force) in the state that the filler neck body 25 is surrounded by the fixation member 70 (hereinafter referred to as "surrounded state"), so as to be protruded in the +Y direction shown in FIG. 3. The filler neck 20 has a groove formed along the Z-axis direction to have the greater width than the widths in the Z-axis direction of the first fixture 71 and the second fixture 72 in the region of the filler neck body 25 to which the fixation member 70 is mounted. This configuration reduces a positional misalignment in the Z-axis direction of the fixation member 70 consisting of the first fixture 71 and the second fixture 72 described above.

Figure 4A:
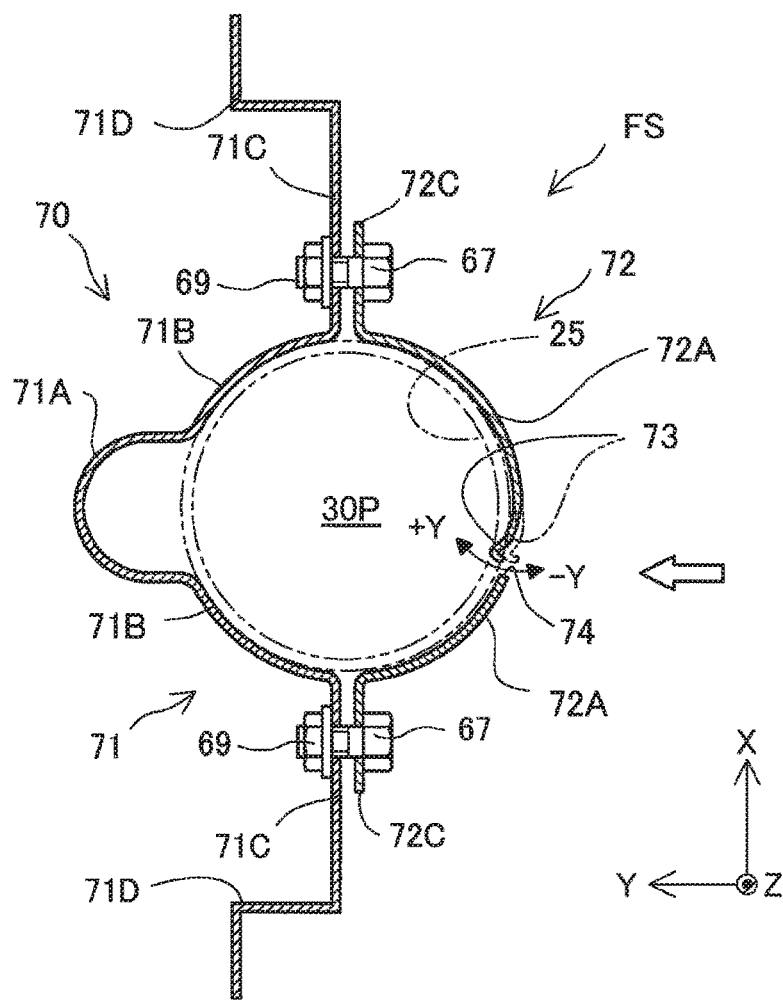
FIG. 4A is a diagram illustrating formation of a flexural deformation portion of a second fixture and its behavior.
Figure 4B:
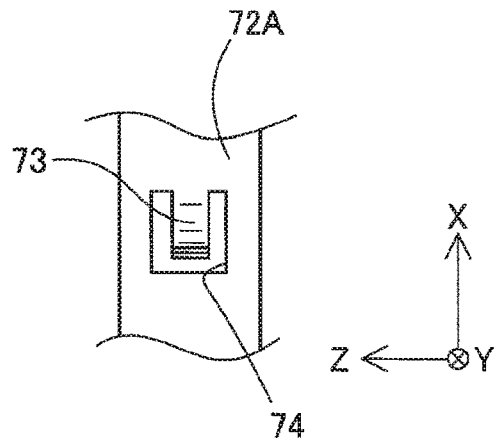
FIG. 4B is a diagram illustrating a punched-out area and the flexural deformation portion of the second fixture viewed in the +Y direction.

FIG. 4A is a diagram illustrating formation of the flexural deformation portion 73 of the second fixture 72 and its behavior. FIG. 4B is a diagram illustrating a punched-out area 74 and the flexural deformation portion 73 of the second fixture 72 viewed in the +Y direction. The flexural deformation portion 73 has a flexural curved piece that is formed to be flexurally deformable by bending a partial region of the large diameter portion 72A of the second fixture 72 included in the fixation member 70 toward the filler neck body 25 of the filler pipe 30 by punching and bending in press working. In other words, as shown in FIG. 4B, when being viewed in the direction of an open arrow in FIG. 4A, the flexural deformation portion 73 is formed along the X-axis direction in an XY plane of the large diameter portion 72A of the second fixture 72 by punching of the punched-out area 74 and is curved to be protruded toward the filler neck body 25, i.e., in the +Y direction shown in FIG. 4A and FIG. 4B after punching or simultaneously with punching. The flexural deformation portion 73 formed as described above is free from an external force and is not flexurally deformed in the state that the filler neck body 25 is not surrounded by the fixation member 70 (hereinafter referred to as "non-surrounded state"). The flexural deformation portion 73 is accordingly located on the inner side of the outer circumference of the filler neck body 25 in the non-surrounded state. In the surrounded state, on the other hand, the flexural deformation portion 73 comes into contact with the filler neck body 25 and is pressed by the filler neck body 25 to be curved in the −Y direction and flexurally deformed and thereby induce a pressing force of pressing the filler neck body 25. As a result, the flexural deformation portion 73 applies the pressing force to the filler neck body 25.

In the fuel supply apparatus FS of the first embodiment having the configuration described above, the flexural deformation portion 73 is formed from a metal hat is unlikely to cause creep deformation. The flexural deformation portion 73 in the non-surrounded state is located on the inner side of the outer circumference of the filler neck body 25 in the surrounded state. Accordingly the flexural deformation portion 73 is deformed in the course of a shift from the non-surrounded state to the surrounded state and presses the filler neck body 25 by the pressing force accompanied with such deformation. This configuration suppresses rattling of the filler pipe 30 over a long time period.

In the fuel supply apparatus FS of the first embodiment, the flexural deformation portion 73 is formed to be flexurally deformable by simply bending a partial region of the second fixture 72 included in the fixation member 70 toward the filler neck body 25 by punching and bending in press working. Accordingly, in the fuel supply apparatus FS of the first embodiment, the flexural deformation portion 73 (flexural curved piece) is obtained by the simple technique of punching and bending.

In the fuel supply apparatus FS of the first embodiment, the second fixture 72 including the flexural deformation portion 73 that comes into contact with the filler neck body 25 is made of metal. This configuration enables the static electricity retaining in the filler neck 20 to be discharged through the fixation positions VB of the vehicle.

Figure 5A:
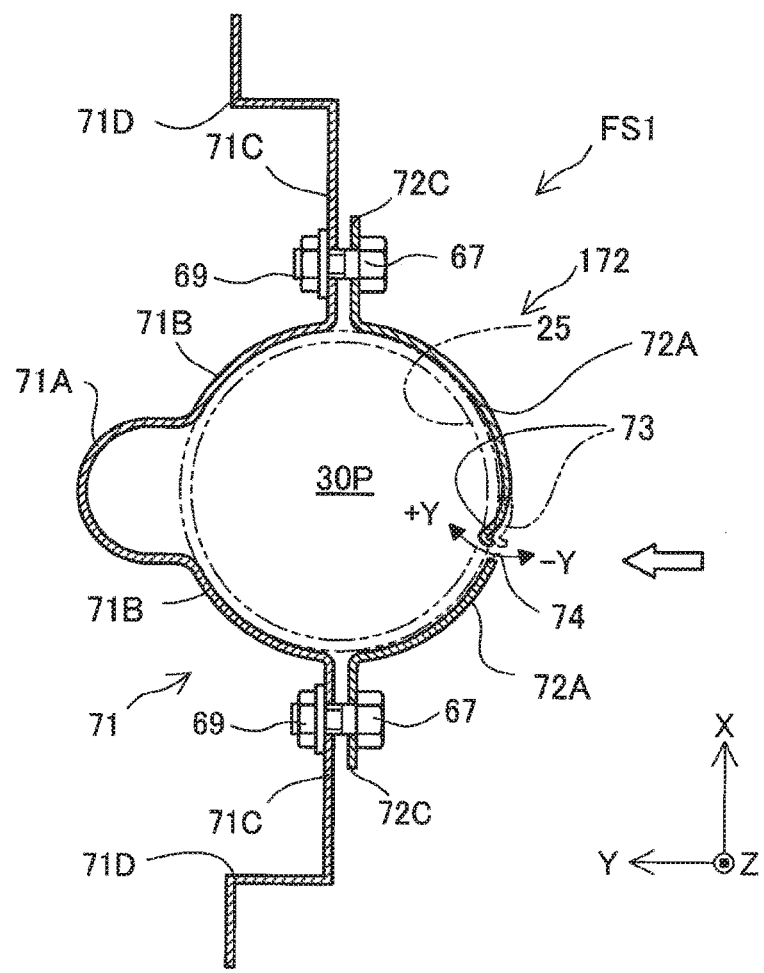
FIG. 5A is a diagram illustrating formation of flexural deformation portions of a second fixture according to a first modification of the first embodiment and their behaviors.
Figure 5B:
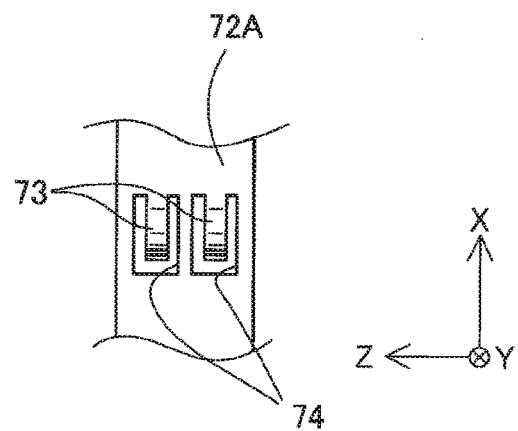
FIG. 5B is a diagram illustrating punched-out areas and the flexural deformation portions of the second fixture according to the first modification of the first embodiment viewed in the +Y direction.

FIG. 5A is a diagram illustrating formation of flexural deformation portions 73 of a second fixture 172 according to a first modification of the first embodiment and their behaviors. FIG. 5B is a diagram illustrating punched-out areas 74 and the flexural deformation portions 73 of the second fixture 172 according to the first modification of the first embodiment viewed in the +Y direction. In the first modification of the first embodiment, the large diameter portion 72A has two flexural deformation portions 73 arrayed along the Y-axis direction. The first modification of the first embodiment also causes the flexural deformation portions 73 in the surrounded state to be flexurally deformed and induce a pressing force, and thereby provides the advantageous effects described above. The plurality of flexural deformation portions 73 enhance the effectiveness of suppressing rattling.

Figure 6A:
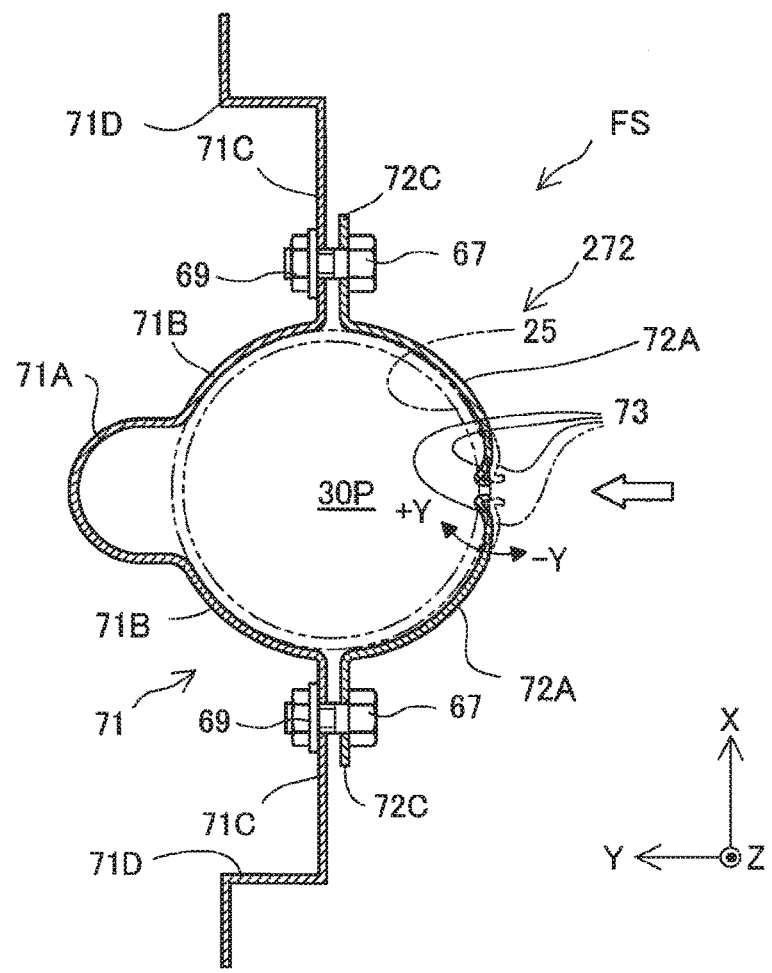
FIG. 6A is a diagram illustrating formation of flexural deformation portions of a second fixture according to a second modification of the first embodiment and their behaviors.
Figure 6B:
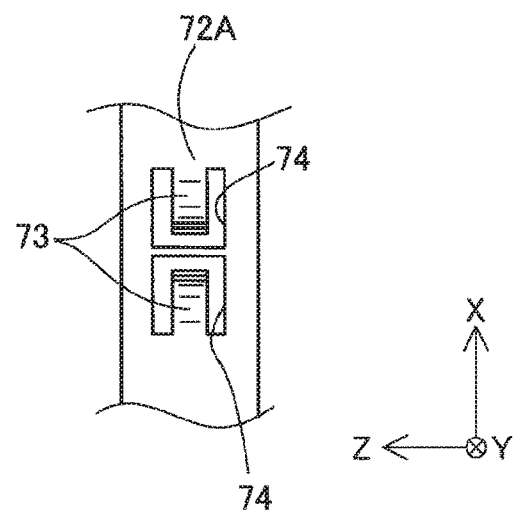
FIG. 6B is a diagram illustrating punched-out areas and the flexural deformation portions of the second fixture according to the second modification of the first embodiment viewed in the +Y direction.

FIG. 6A is a diagram illustrating formation of flexural deformation portions 73 of a second fixture 272 according to a second modification of the first embodiment and their behaviors. FIG. 6B is a diagram illustrating punched-out areas 74 and the flexural deformation portions 73 of the second fixture 272 according to the second modification of the first embodiment viewed in the +Y direction. In the second modification of the first embodiment, the large diameter portion 72A has two flexural deformation portions 73 arrayed along the X-axis direction. The second modification of the first embodiment also causes the flexural deformation portions 73 in the surrounded state to be flexurally deformed and induce a pressing force, and thereby provides the advantageous effects described above. The plurality of flexural deformation portions 73 enhance the effectiveness of suppressing rattling.

Figure 7A:
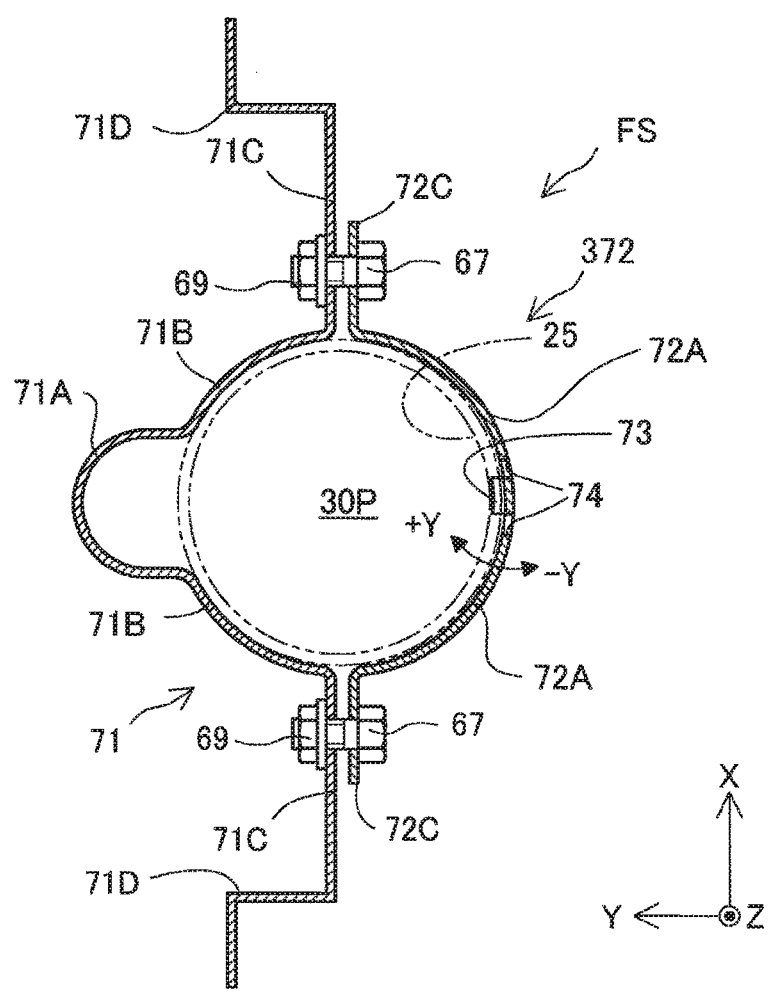
FIG. 7A is a diagram illustrating formation of a flexural deformation portion of a second fixture according to a third modification of the first embodiment and its behavior.
Figure 7B:
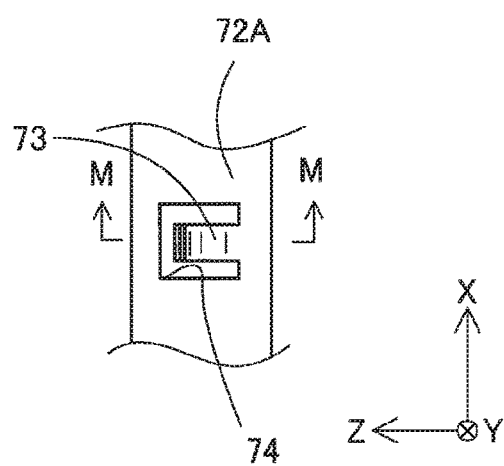
FIG. 7B is a diagram illustrating a punched-out area and the flexural deformation portion of the second fixture according to the third modification of the first embodiment viewed in the +Y direction.
Figure 7C:
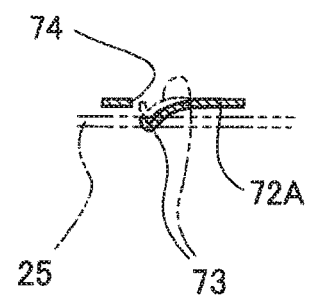
FIG. 7C is a diagram illustrating an M-M section in FIG. 7B.

FIG. 7A is a diagram illustrating formation of a flexural deformation portion 73 of a second fixture 372 according to a third modification of the first embodiment and its behavior. FIG. 7B is a diagram illustrating a punched-out area 74 and the flexural deformation portion 73 of the second fixture 372 according to the third modification of the first embodiment viewed in the +Y direction. FIG. 7C is a diagram illustrating an M-M section in FIG. 7B. In the third modification of the first embodiment, the flexural deformation portion 73 is formed to face the +Y direction in the large diameter portion 72A. The third modification of the first embodiment also causes the flexural deformation portion 73 in the surrounded state to be flexurally deformed and induce a pressing force, and thereby provides the advantageous effects described above.

Figure 8A:
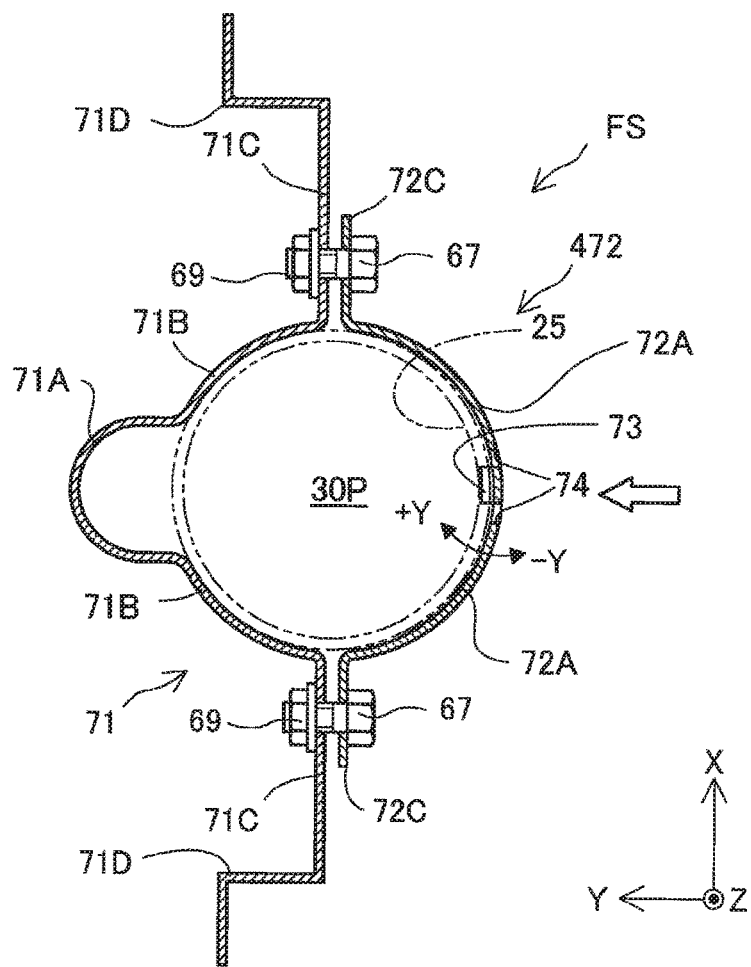
FIG. 8A is a diagram illustrating formation of a flexural deformation portion of a second fixture according to a fourth modification of the first embodiment and its behavior.
Figure 8B:
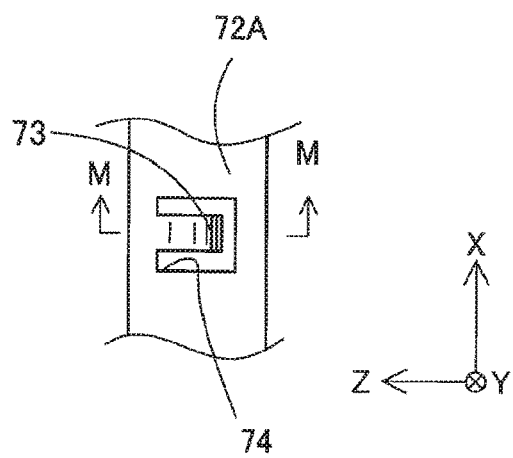
FIG. 8B is a diagram illustrating a punched-out area and the flexural deformation portion of the second fixture according to the fourth modification of the first embodiment viewed in the +Y direction.
Figure 8C:
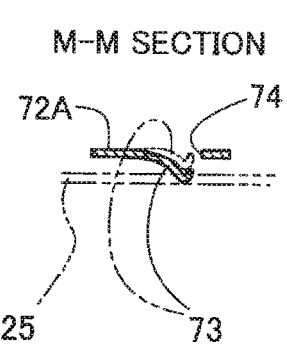
FIG. 8C is a diagram illustrating an M-M section in FIG. 8B.

FIG. 8A is a diagram illustrating formation of a flexural deformation portion 73 of a second fixture 472 according to a fourth modification of the first embodiment and its behavior. FIG. 8B is a diagram illustrating a punched-out area 74 and the flexural deformation portion 73 of the second fixture 472 according to the fourth modification of the first embodiment viewed in the +Y direction. FIG. 8C is a diagram illustrating an M-M section in FIG. 8B. In the fourth modification of the first embodiment, the flexural deformation portion 73 is formed to face the −Y direction of the Y axis in the large diameter portion 72A. The fourth modification of the first embodiment also causes the flexural deformation portion 73 in the surrounded state to be flexurally deformed and induce a pressing force, and thereby provides the advantageous effects described above.

Figure 9A:
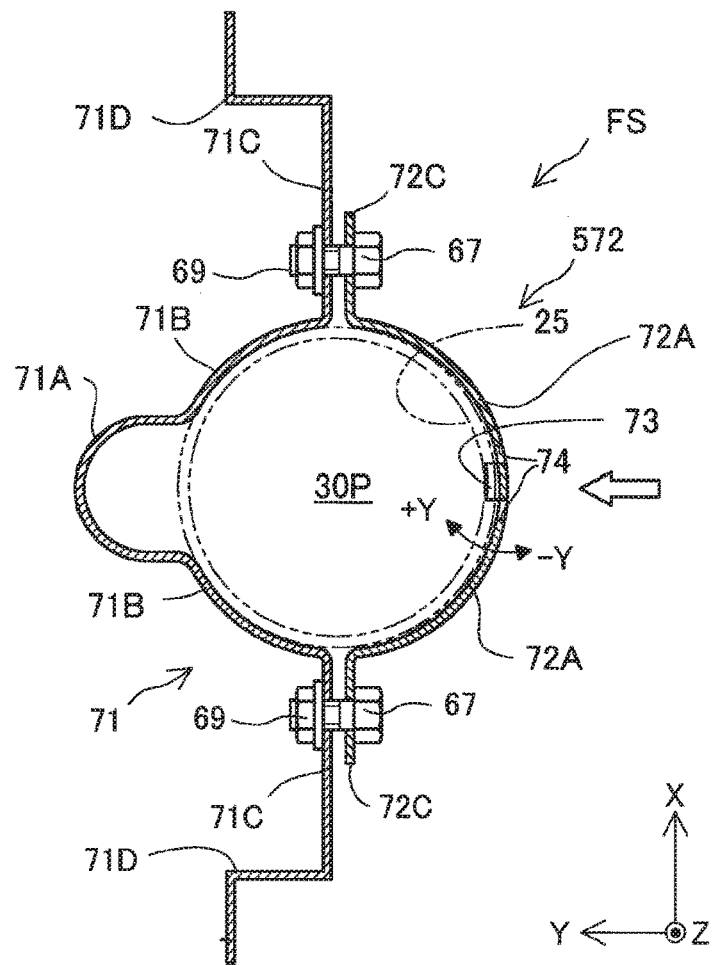
FIG. 9A is a diagram illustrating formation of a flexural deformation portion of a second fixture according to a fifth modification of the first embodiment and its behavior.
Figure 9B:
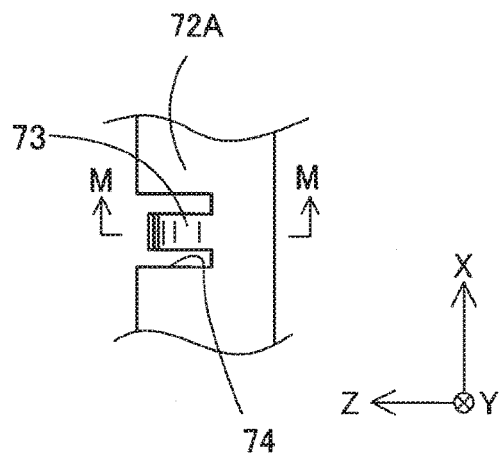
FIG. 9B is a diagram illustrating a punched-out area and the flexural deformation portion of the second fixture according to the fifth modification of the first embodiment viewed in the +Y direction.
Figure 9C:
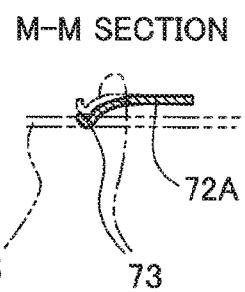
FIG. 9C is a diagram illustrating an M-M section in FIG. 9B.

FIG. 9A is a diagram illustrating formation of a flexural deformation portion 73 of a second fixture 572 according to a fifth modification of the first embodiment and its behavior. FIG. 9B is a diagram illustrating a punched-out area 74 and the flexural deformation portion 73 of the second fixture 572 according to the fifth modification of the first embodiment viewed in the +Y direction. FIG. 9C is a diagram illustrating an M-M section in FIG. 9B. In this fifth modification, the flexural deformation portion 73 is formed to face the +Y direction of the Y axis in the large diameter portion 72A, and the punched-out area 74 surrounding the flexural deformation portion 73 is open on the +Y side of the Y axis. The fifth modification of the first embodiment also causes the flexural deformation portion 73 in the surrounded state to be flexurally deformed and induce a pressing force, and thereby provides the advantageous effects described above.

Figure 10A:
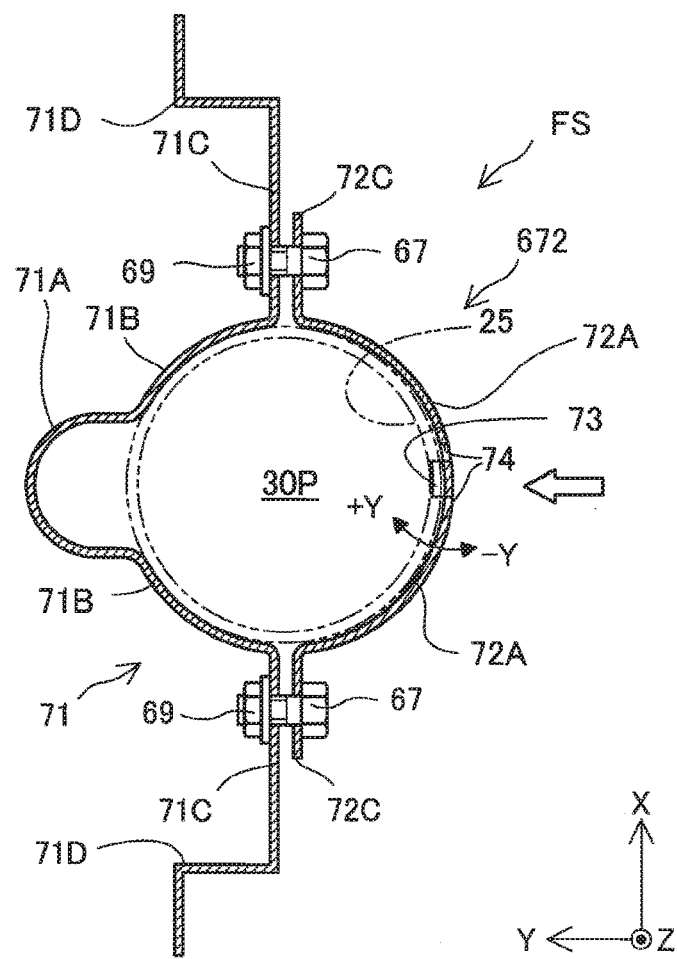
FIG. 10A is a diagram illustrating formation of a flexural deformation portion of a second fixture according to a sixth modification of the first embodiment and its behavior.
Figure 10B:
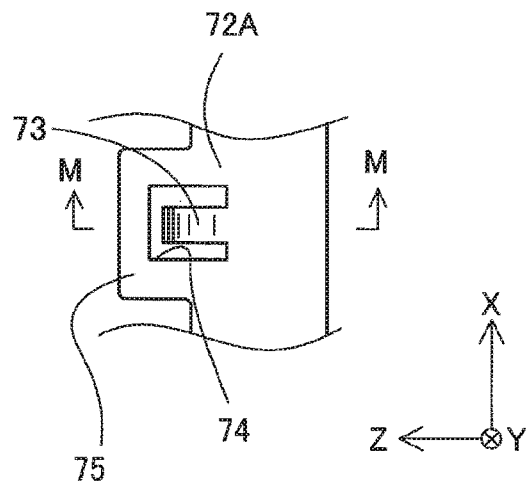
FIG. 10B is a diagram illustrating a punched-out area and the flexural deformation portion of the second fixture according to the sixth modification of the first embodiment viewed in the +Y direction.
Figure 10C:
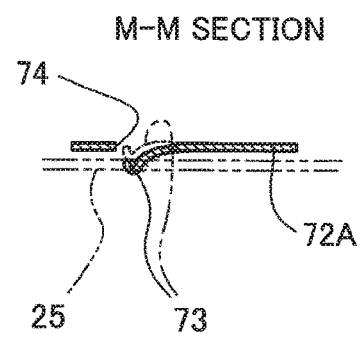
FIG. 10C is a diagram illustrating an M-M section in FIG. 10B.

FIG. 10A is a diagram illustrating formation of a flexural deformation portion 73 of a second fixture 672 according to a sixth modification of the first embodiment and its behavior. FIG. 10B is a diagram illustrating a punched-out area 74 and the flexural deformation portion 73 of the second fixture 672 according to the sixth modification of the first embodiment viewed in the +Y direction. FIG. 10C is a diagram illustrating an M-M section in FIG. 10B. In this sixth modification, the large diameter portion 72A has a projection 75 that is protruded in the +Y direction of the Y axis and includes the flexural deformation portion 73 that is formed on the projection 75 to face the +Y direction of the Y axis. The sixth modification of the first embodiment also causes the flexural deformation portion 73 in the surrounded state to be flexurally deformed and induce a pressing force, and thereby provides the advantageous effects described above.

Figure 11A:
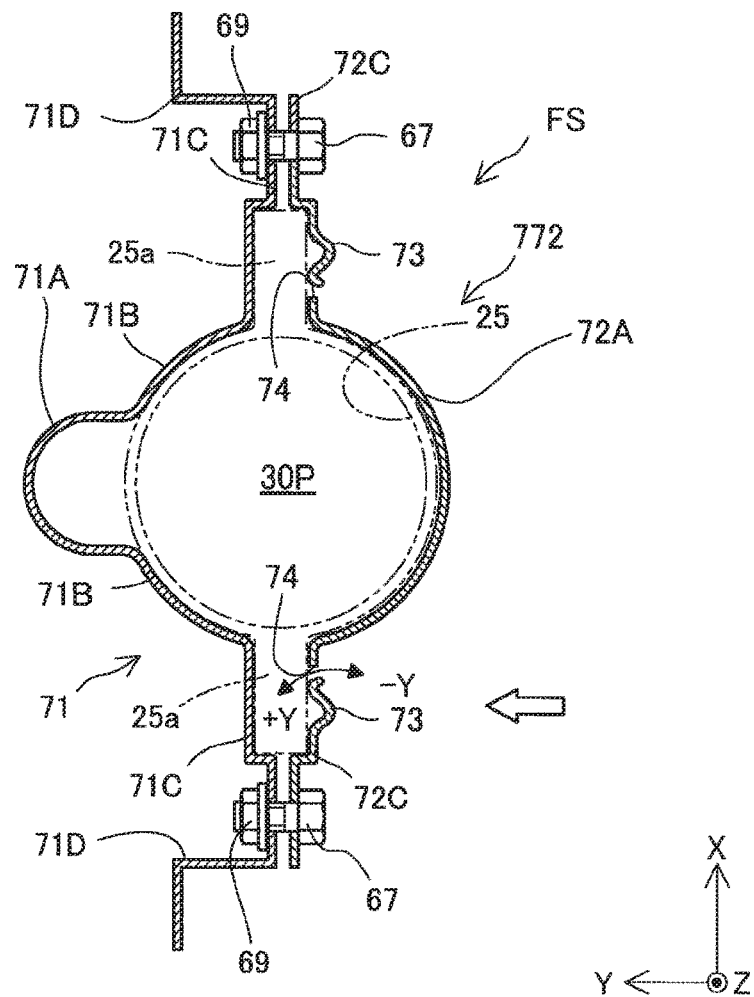
FIG. 11A is a diagram illustrating formation of a flexural deformation portion of a second fixture according to a seventh modification of the first embodiment and its behavior.
Figure 11B:
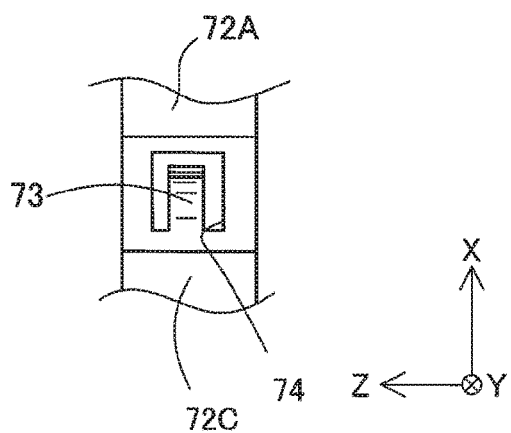
FIG. 11B is a diagram illustrating a punched-out area and the flexural deformation portion of the second fixture according to the seventh modification of the first embodiment viewed in the +Y direction.
Figure 11C:
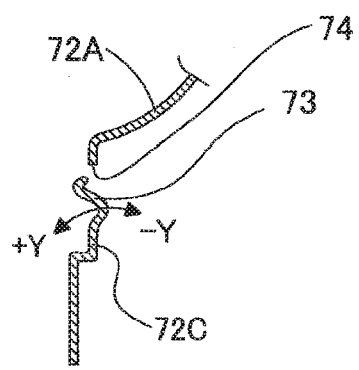
FIG. 11C is a diagram illustrating the flexural deformation portion in the non-surrounded state according to the seventh modification of the first embodiment.

FIG. 11A is a diagram illustrating formation of flexural deformation portions 73 of a second fixture 772 according to a seventh modification of the first embodiment and their behaviors. FIG. 11B is a diagram illustrating punched-out areas 74 and the flexural deformation portions 73 of the second fixture 772 according to the seventh modification of the first embodiment viewed in the +Y direction. FIG. 11C is a diagram illustrating the flexural deformation portion 73 in the non-surrounded state according to the seventh modification of the first embodiment. In this seventh modification, the filler neck body 25 includes convexes 25a for positioning provided on its respective ends in the X-axis direction. In a first fixture 71 and the second fixture 772 arranged to surround the filler neck body 25, flat plate portions 71C and flat plate portions 72C are bent to hold the convexes 25a placed therebetween in the Y-axis direction. The second fixture 772 includes the flexural deformation portions 73 provided on the respective flat plate portions 72C. As shown in FIG. 11C, the flat plate portion 72C is bent in the +Y direction at the flexural deformation portion 73 in the non-surrounded state. In the surrounded state, the convex 25a is placed between the flat plate portion 71C and the flat plate portion 72C, and the filler neck body 25 is surrounded by the curved portion 71A and the large diameter portion 72A. In the surrounded state, the flexural deformation portion 73 is pressed by the convex 25a to be flexurally deformed in the −Y direction of the Y axis, induce a pressing force and provide the pressing force to the convex 25a. The seventh modification of the first embodiment accordingly causes the flexural deformation portion 73 to be flexurally deformed and induce a pressing force when the convex 25a of the filler neck body 25 is held, and thereby provides the advantageous effects described above. The flexural deformation portion 73 may be provided only one of the flat plate portions 72C of the second fixture 772.

Figure 12A:
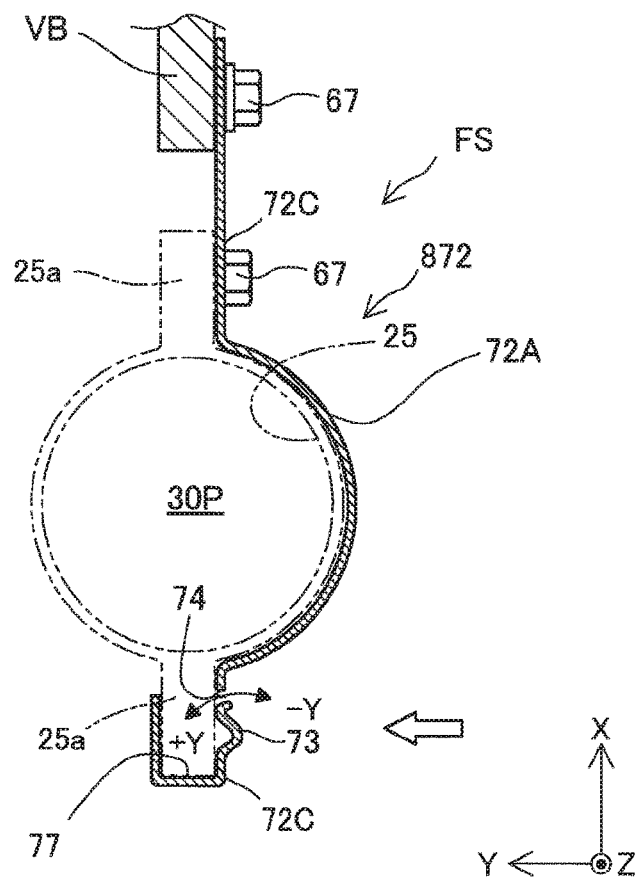
FIG. 12A is a diagram illustrating formation of a flexural deformation portion of a second fixture according to an eighth modification of the first embodiment and its behavior.
Figure 12B:
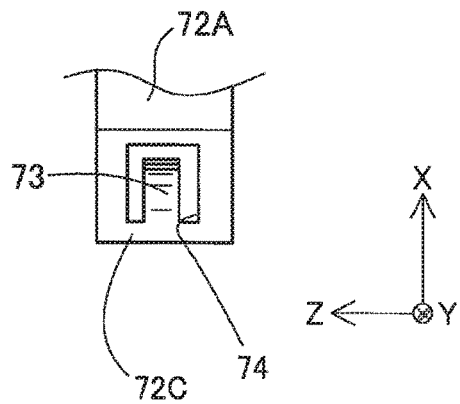
FIG. 12B is a diagram illustrating a punched-out area and the flexural deformation portion of the second fixture according to the eighth modification of the first embodiment viewed in the +Y direction.
Figure 12C:
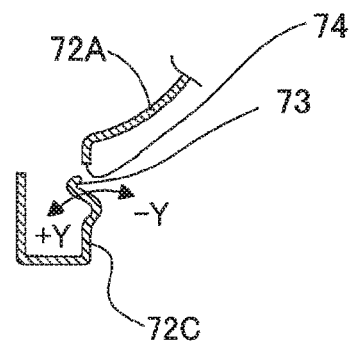
FIG. 12C is a diagram illustrating the flexural deformation portion in the non-surrounded state according to the eighth modification of the first embodiment.

FIG. 12A is a diagram illustrating formation of a flexural deformation portion 73 of a second fixture 872 according to an eighth modification of the first embodiment and its behavior. FIG. 12B is a diagram illustrating a punched-out area 74 and the flexural deformation portion 73 of the second fixture 872 according to the eighth modification of the first embodiment viewed in the +Y direction. FIG. 12C is a diagram illustrating the flexural deformation portion 73 in the non-surrounded state according to the eighth modification of the first embodiment. In this eighth modification, the filler neck body 25 includes convexes 25a for positioning, and the fuel supply apparatus FS holds the filler neck body 25 only by the second fixture 872. In the second fixture 872, one flat plate portion 72C on the −X direction side includes the flexural deformation portion 73 and a recess 77 formed by bending the flat plate portion 72C. One convex 25a of the filler neck 20 is placed in this recess 77, and the other convex 25a is screwed and fixed to the other flat plate portion 72C by means of a bolt 67. The second fixture 872 accordingly surrounds the filler neck body 25 of the filler neck 20 in the region of the large diameter portion 72A to hold the filler neck 20. As shown in FIG. 12C, the flat plate portion 72C is bent in the +Y direction at the flexural deformation portion 73 in the non-surrounded state. In the surrounded state, accompanied with placement of the convex 25a in the recess 77, the flexural deformation portion 73 is pressed by the convex 25a to be flexurally deformed in the −Y direction of the Y axis, induce a pressing force and provide the pressing force to the convex 25a. The eighth modification of the first embodiment accordingly causes the flexural deformation portion 73 to be flexurally deformed and induce a pressing force when the convex 25a of the filler neck body 25 is held, and thereby provides the advantageous effects described above.

B. Second Embodiment

Figure 13:
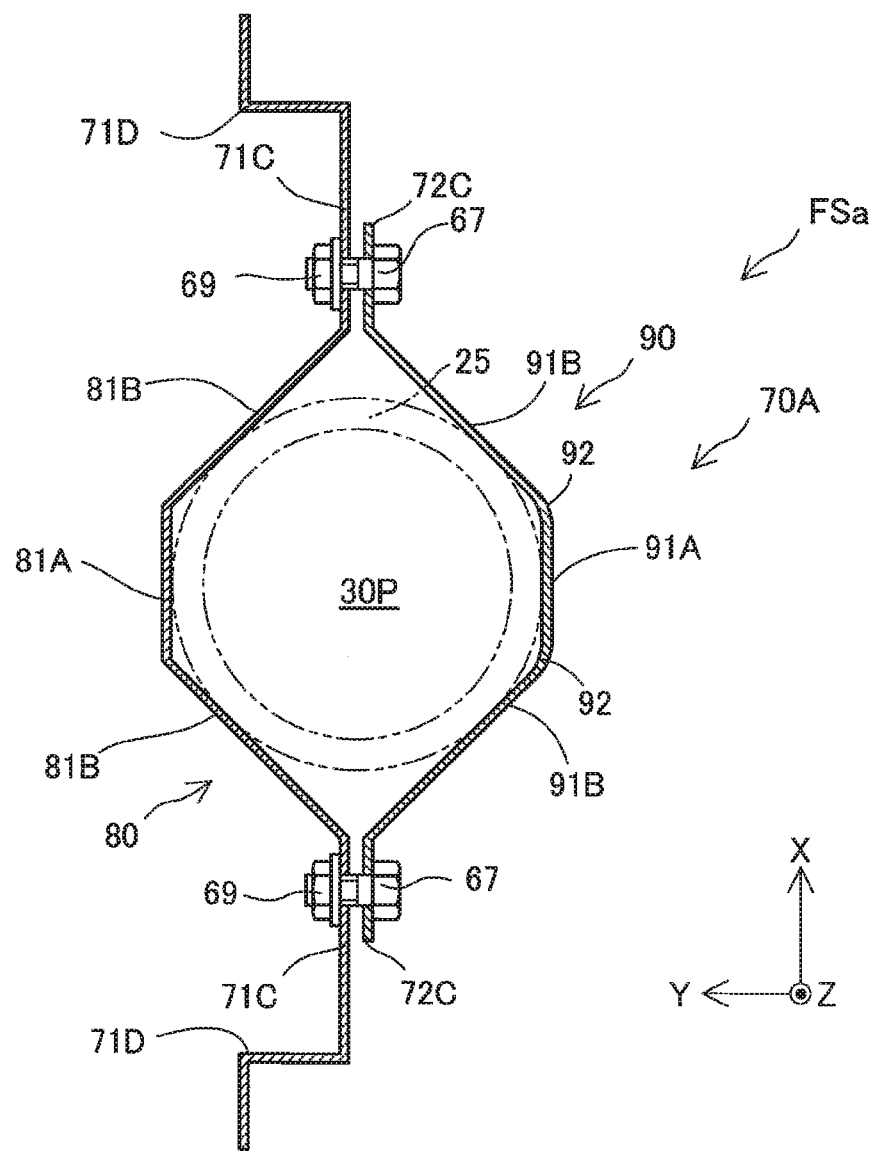
FIG. 13 is a sectional view schematically illustrating a fixation member provided to hold a filler neck body in a fuel supply apparatus according to a second embodiment.
Figure 14:
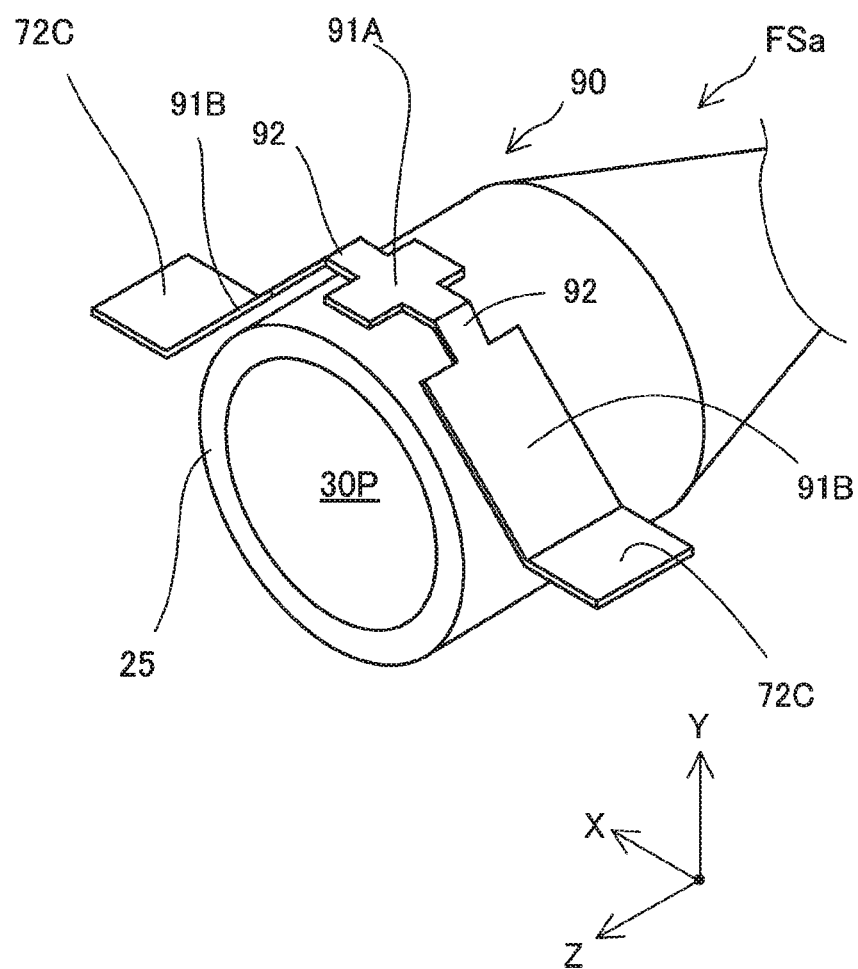
FIG. 14 is a perspective view schematically illustrating a second fixture in relation to the filler neck body.

FIG. 13 is a sectional view schematically illustrating a fixation member 70A provided to hold the filler neck body 25 in a fuel supply apparatus FSa according to a second embodiment. FIG. 14 is a perspective view schematically illustrating a second fixture 90 in relation to the filler neck body 25.

The fixation member 70A of the second embodiment includes a first fixture 80 and a second fixture 90 respectively formed by pressing metal plate members such as conductive stainless steel plates. The first fixture 80 and the second fixture 90 are respectively formed in band-like outer shapes. The first fixture 80 and the second fixture 90 are arranged to surround the filler neck body 25 and hold the filler neck 20. The first fixture 80 includes inclined plates 81B on respective sides of a flat receiving plate 81A. Flat plate portions 71C are arranged to be continuous with the inclined plates 81B. Fixation element portions 71D are arranged to be continuous with the respective ends of the corresponding flat plate portions 71C. The first fixture 80 is provided to come into contact with the outer circumferential wall of the filler neck body 25 by the receiving plate 81A and the inclined plates 81B facing each other. The first fixture 80 receives the filler neck body 25 to surround a semicircular region of the filler neck body 25. The second fixture 90 includes inclined plates 91B on respective sides of a flat receiving plate 91A. In the second fixture 90, the receiving plate 91A is arranged to be continuous with the inclined plates 91B via fragile portions 92. Like the first fixture 80, the second fixture 90 is provided to surround a semicircular region of the filler neck body 25. The first fixture 80 and the second fixture 90 are clamped and fixed to each other by means of bolts 67 and nuts 69 as described above.

The fragile portions 92 are formed by cutting out in the width direction to have a narrow width in partial regions of the second fixture 90 of the fixation member 70A or more specifically in locations where the receiving plate 91A is continuous with the inclined plates 91B, as shown in FIG. 14. The fragile portions 92 are flexurally deformed and curved in the course of a shift from the state that the second fixture 90 of the fixation member 70A does not hold the filler neck body 25 (non-surrounded state) to the state that the second fixture 90 cooperates with the first fixture 80 to surround and hold the filler neck body 25 (surrounded state). Bending the fragile portions 92 causes a change in the shape in the locations where the receiving plate 91A is continuous with the inclined plates 91B and thereby induces a pressing force. The pressing force is provided to the filler neck body 25 from the locations where the receiving plate 91A and the inclined plates 91B come into contact with the filler neck body 25. In the fuel supply apparatus FSa of the second embodiment, the metal second fixture 90 having a change in the shape by the fragile portions 92 formed in the partial regions of the second fixture 90 presses the filler neck body 25 of the filler pipe 30 (shown in FIG. 1) and thereby suppresses rattling over a long time period. With regard to the first fixture 80, the receiving plate 81A may be arranged to be continuous with the inclined plates 81B via fragile portions 92 of the narrow width.

Figure 15:
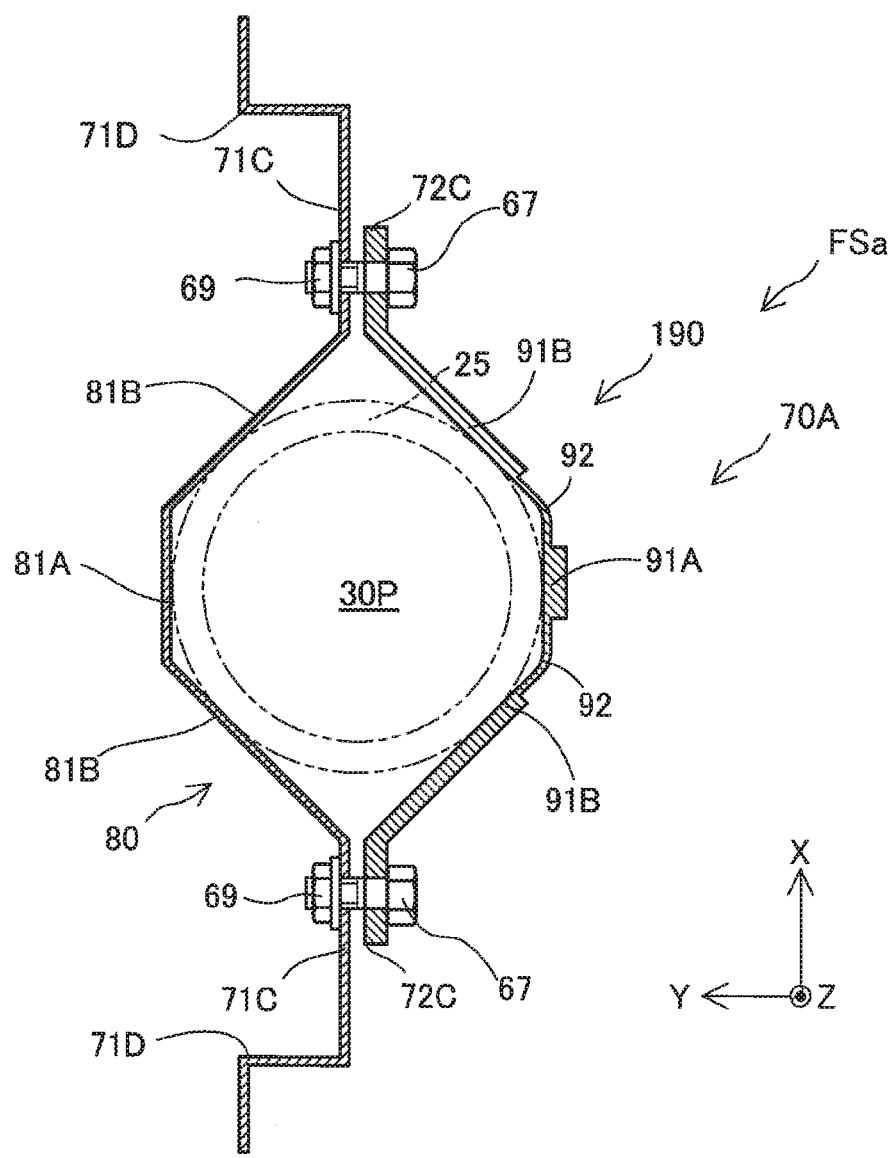
FIG. 15 is a sectional view schematically illustrating a second fixture provided to hold the filler neck body according to a modification of the second embodiment.
Figure 16:
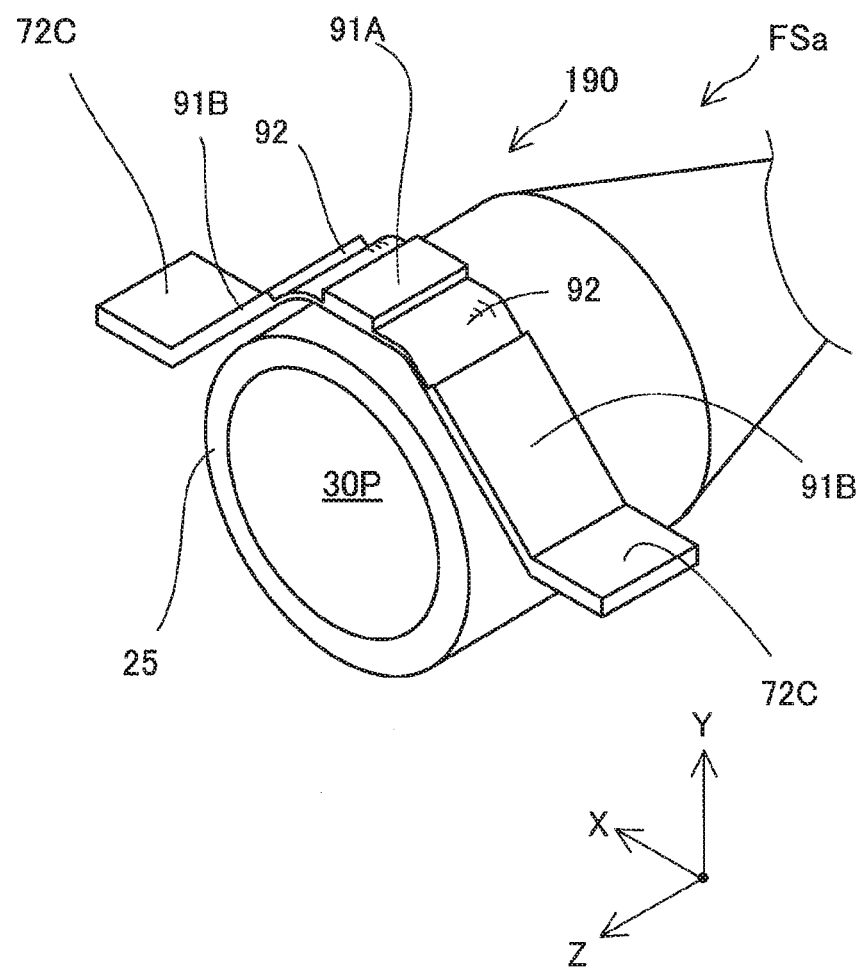
FIG. 16 is a perspective view schematically illustrating the second fixture of the modification in relation to the filler neck body.

FIG. 15 is a sectional view schematically illustrating a second fixture 190 provided to hold the filler neck body 25 according to a modification of the second embodiment. FIG. 16 is a perspective view schematically illustrating the second fixture 190 of the modification in relation to the filler neck body 25. In these drawings, the difference in thickness between the respective portions is emphasized for the purpose of better understanding.

According to the modification of the second embodiment, the fragile portions 92 provided to make the inclined plates 91B continuous with the receiving plate 91A of the second fixture 190 are made thinner than both the receiving plate 91A and the inclination plate 91B. According to this modification of the second embodiment, the fragile portions 92 are flexurally deformed and curved in the course of a shift from the state that the second fixture 190 of the fixation member 70A does not hold the filler neck body 25 to the state that the second fixture 190 cooperates with the first fixture 80 to surround and hold the filler neck body 25. As a result, like the second embodiment, in the fuel supply apparatus FSa according to the modification of the second embodiment, the second fixture 190 presses the filler neck body 25 of the filler pipe 30 (shown in FIG. 1) and thereby suppresses rattling over a long time period. With regard to the first fixture 80, the receiving plate 81A may be arranged to be continuous with the inclined plates 81B via thin fragile portions 92.

C. Other Embodiments

According to one embodiment of the present disclosure, there is provided a fuel supply apparatus. The fuel supply apparatus may comprise a resin filler pipe configured to form a fuel passage from a filler port to a fuel tank; and a metal fixation member configured to fix the filler pipe to a vehicle body. The fixation member may include a surrounding portion configured to surround outside of at least part of the filler pipe, and a fixation portion configured to fix the surrounding portion to the vehicle body. At least part of the surrounding portion may be formed as an elastically deformable flexural deformation portion. At least part of the flexural deformation portion in a non-surrounded state that the surrounding portion does not surround outside of at least part of the filler pipe may be located on an inner side of outer circumference of the filler pipe in a surrounded state that the surrounding portion is arranged to surround outside of at least part of the filler pipe.

In the fuel supply apparatus of this embodiment, the flexural deformation portion is made of a metal that is unlikely to cause creep deformation. At least part of the flexural deformation portion in the non-surrounded state is located on the inner side of the outer circumference of the filler pipe in the surrounded state. The flexural deformation portion is deformed in the course of a shift from the non-surrounded state to the surrounded state and presses the filler pipe by a force induced by such deformation. This configuration suppresses rattling of the filler pipe over a long time period.

In the fuel supply apparatus according to each of the embodiments and the modifications described above, the flexural deformation portion may include a flexural curved piece formed to be flexurally deformable by bending a partial region of the surrounding portion toward the filler pipe. This configuration enables the flexural deformation portion to be readily formed by the simple technique of bending a partial region of the surrounding portion.

In the fuel supply apparatus according to each of the embodiments and the modifications described above, the flexural deformation portion may be flexurally deformed to change the shape of the surrounding portion in the course of a shift from the non-surrounded state to the surrounded state. This configuration causes the flexural deformation portion formed in the partial region of the surrounding portion to change the shape of the surrounding portion and press the surrounding portion against the filler pipe.

The disclosure may be implemented by any of various other aspects, for example, a fixture for a filler pipe.

The disclosure is not limited to any of the embodiments and the modifications described above but may be implemented by a diversity of other configurations without departing from the scope of the disclosure. For example, the technical features of any of the embodiments and the modifications corresponding to the technical features of each of the aspects described in SUMMARY may be replaced or combined appropriately, in order to solve part or all of the problems described above or in order to achieve part or all of the advantageous effects described above. Any of the technical features may be omitted appropriately unless the technical feature is described as essential herein.

In the respective embodiments described above, the fixation member 70 is provided to surround the filler neck body 25 and thereby hold the filler pipe 30. According to a modification, the fixation member 70 may be provided to surround a portion downstream of the filler neck 20, for example, a linear pipeline portion of the filler tube 40 shown in FIG. 1, and thereby hold the filler pipe 30.

Figure 17A:
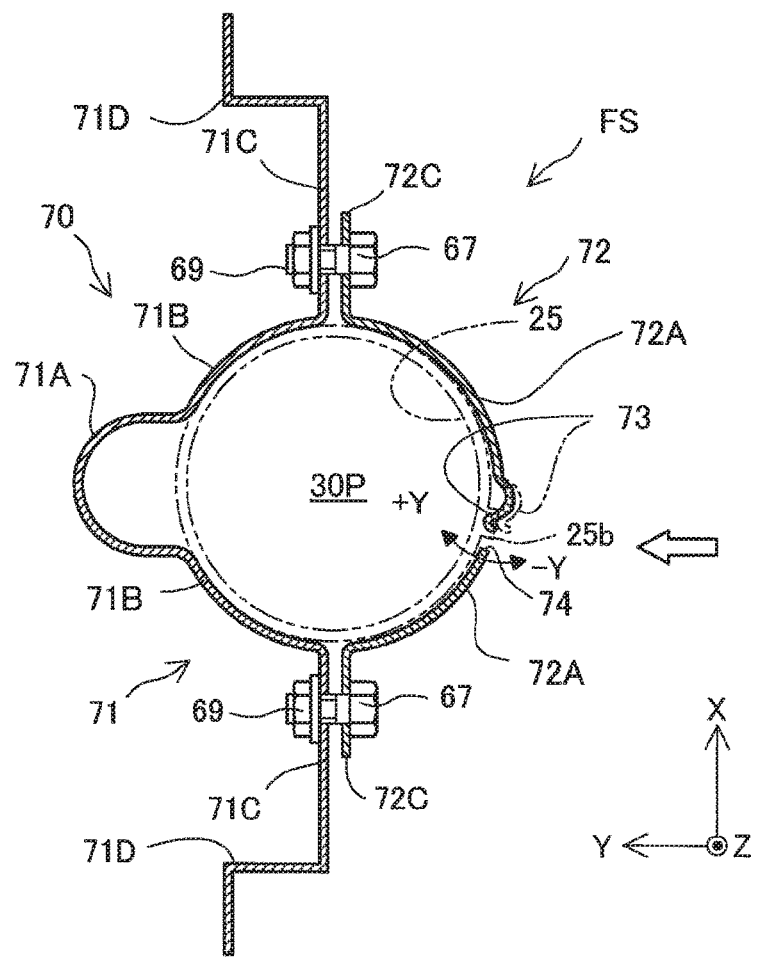
FIG. 17A is a sectional view illustrating the periphery of a fixation member provided to hold a filler neck body having a convex in a partial region on its outer circumference.
Figure 17B:
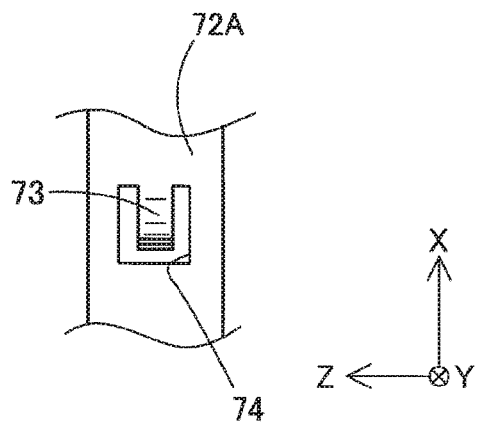
FIG. 17B is a diagram illustrating a punched-out area and a flexural deformation portion of the fixation member provided to hold the filler neck body having the convex in the partial region on its outer circumference, viewed in the +Y direction.

In the respective embodiments and modifications described above, the filler neck body 25 has the arc-shaped outer circumference. According to a modification, the filler neck body 25 may have a convex provided in a partial region of its outer circumference. FIG. 17A is a sectional view illustrating the periphery of a fixation member 70 provided to hold a filler neck body 25 having an outer convex 25b. FIG. 17B is a diagram illustrating a punched-out area 74 and a flexural deformation portion 73 of the fixation member 70 provided to hold the filler neck body 25 having the outer convex 25b, viewed in the +Y direction. The outer convex 25b is protruded from a partial region of the outer circumference of the filler neck body 25. The flexural deformation portion 73 is free from an external force and is not flexurally deformed in the non-surrounded state. The flexural deformation portion 73 is accordingly located on the inner side of a top face of the outer convex 25b that forms the outer circumference of the filler neck body 25. In the surrounded state, on the other hand, the flexural deformation portion 73 comes into contact with the top face of the outer convex 25b and is pressed to be curved in the −Y direction and flexurally deformed, thereby inducing a pressing force of pressing the outer convex 25b of the filler neck body 25. Pressing the flexural deformation portion 73 that is unlikely to cause creep deformation against the filler neck body 25 having the outer convex 25b suppresses rattling over a long time period.

The invention claimed is:

1. A fuel supply apparatus, comprising:
a resin filler pipe configured to form a fuel passage from a filler port to a fuel tank; and
a metal fixation member configured to fix the filler pipe to a vehicle body, wherein
the fixation member includes a surrounding portion configured to surround outside of at least part of the filler pipe, and a fixation portion configured to fix the surrounding portion to the vehicle body,
at least part of the surrounding portion is formed as an elastically deformable flexural deformation portion,
in a non-surrounded state the surrounding portion does not surround outside of at least part of the filler pipe, in a surrounded state the surrounding portion is arranged to surround outside of at least part of the filler pipe, in the non-surrounded state at least a part of the flexural deformation portion curves inward in a radial direction to a position where the outer circumference of the filler pipe is located in the surrounded state, and in the surrounded state the flexural deformation portion is located less inward in the radial direction than in the non-surrounded state, and
the flexural deformation portion includes a flexural curved piece that is formed to be flexurally deformable by bending a partial region of the surrounding portion toward the filler pipe.

2. A fuel supply apparatus, comprising:
a resin filler pipe configured to form a fuel passage from a filler port to a fuel tank; and
a metal fixation member configured to fix the filler pipe to a vehicle body, wherein
the fixation member includes a surrounding portion configured to surround outside of at least part of the filler pipe, and a fixation portion configured to fix the surrounding portion to the vehicle body,
at least part of the surrounding portion is formed as an elastically deformable flexural deformation portion,
in a non-surrounded state the surrounding portion does not surround outside of at least part of the filler pipe, in a surrounded state the surrounding portion is arranged to surround outside of at least part of the filler pipe, in the non-surrounded state at least a part of the flexural deformation portion curves inward in a radial direction to a position where the outer circumference of the filler pipe is located in the surrounded state, and in the surrounded state the flexural deformation portion is located less inward in the radial direction than in the non-surrounded state, and
the flexural deformation portion is flexurally deformed to change shape of the surrounding portion during a shift from the non-surrounded state to the surrounded state.

3. The fuel supply apparatus according to claim 1, wherein the flexural deformation piece is curved and flexurally deformed to be protruded toward the filler pipe.

* * * * *